(12) United States Patent
Ross et al.

(10) Patent No.: US 10,635,676 B2
(45) Date of Patent: Apr. 28, 2020

(54) ALGORITHMIC RADIO FOR ARBITRARY TEXTUAL QUERIES

(71) Applicant: Google Inc., Mountain View, CA (US)

(72) Inventors: David Alexander Ross, San Jose, CA (US); Weijian Cheng, Mountain View, CA (US); Nitin Jindal, Mountain View, CA (US); Sherol Chen, San Mateo, CA (US)

(73) Assignee: Google LLC, Mountain View, CA (US)

( * ) Notice: Subject to any disclaimer, the term of this patent is extended or adjusted under 35 U.S.C. 154(b) by 572 days.

(21) Appl. No.: 14/706,787

(22) Filed: May 7, 2015

(65) Prior Publication Data

US 2016/0328404 A1 Nov. 10, 2016

(51) Int. Cl.
*G06F 16/2457* (2019.01)
*G06F 16/438* (2019.01)

(52) U.S. Cl.
CPC .... *G06F 16/24578* (2019.01); *G06F 16/4387* (2019.01)

(58) Field of Classification Search
CPC .......... G06F 17/3053; G06F 17/30053; G06F 16/24578; G06F 16/4387
See application file for complete search history.

(56) References Cited

U.S. PATENT DOCUMENTS

| | | | |
|---|---|---|---|
| 8,260,656 B1 * | 9/2012 | Harbick | G06Q 30/02 705/26.7 |
| 8,972,391 B1 * | 3/2015 | McDonnell | G06F 17/3053 707/727 |
| 2002/0045960 A1 * | 4/2002 | Phillips | G11B 19/025 700/94 |
| 2006/0143236 A1 * | 6/2006 | Wu | G06F 17/30053 |
| 2007/0247979 A1 * | 10/2007 | Brillon | G06Q 30/0603 369/30.06 |
| 2008/0147640 A1 * | 6/2008 | Schachter | G06F 17/30864 |
| 2008/0147711 A1 | 6/2008 | Spiegelman et al. | |
| 2009/0150445 A1 * | 6/2009 | Herberger | G06F 16/683 |
| 2012/0303713 A1 * | 11/2012 | Harbick | G06Q 30/02 709/204 |

(Continued)

FOREIGN PATENT DOCUMENTS

JP 2007037031 2/2007
JP 2008047269 2/2008

(Continued)

OTHER PUBLICATIONS

International Search Report and Written Opinion for PCT Application PCT/US2016/024749 dated Jun. 21, 2016, 10 pages.

(Continued)

*Primary Examiner* — Cam Y T Truong
(74) *Attorney, Agent, or Firm* — Lowenstein Sandler LLP (57) ABSTRACT

A text query from a user may be received. Playlists associated with the text query may be identified. A relevance score may be calculated for each of the playlists based at least in part on a relevance of the corresponding playlist to the text query. Furthermore, content items may be identified where each of the content items is included in at least one of the playlists. For each of the identified content items, one or more playlists that includes the corresponding content item may be identified. A score for each of the content items may be calculated based on the relevance score for each of the playlists that includes the corresponding content item. Furthermore, a new playlist may be generated for the user based on the scores for each of the content items.

18 Claims, 8 Drawing Sheets

(56) References Cited

U.S. PATENT DOCUMENTS

| | | | |
|---|---|---|---|
| 2013/0144750 A1* | 6/2013 | Brown | G06Q 30/0631 705/26.7 |
| 2013/0173656 A1 | 7/2013 | Spiegelman et al. | |
| 2013/0246522 A1* | 9/2013 | Bilinski | H04N 21/4758 709/204 |
| 2014/0074861 A1 | 3/2014 | Bieschke et al. | |
| 2014/0281977 A1* | 9/2014 | Schupak | G06F 3/04817 715/716 |
| 2014/0297630 A1* | 10/2014 | Cao | G06F 17/30864 707/725 |
| 2014/0380386 A1 | 12/2014 | Voss | |
| 2015/0039644 A1* | 2/2015 | Trivedi | H04L 67/22 707/767 |
| 2016/0342310 A1* | 11/2016 | Schupak | G06F 3/04817 |

FOREIGN PATENT DOCUMENTS

| | | |
|---|---|---|
| JP | 2013210721 | 10/2013 |
| JP | 2017-551255 | 2/2015 |
| WO | 2008/011341 A3 | 8/2013 |

OTHER PUBLICATIONS

The Playlist Miner "Music Machinery". pp. 1-6. Website page posted on Dec. 19, 2014. retreived from: http://musicmachinery.com/2014/12/19/the-playlist-miner/.

Korean Patent Office, Notice of Preliminary Rejection for Application No. 10-2017-7027453, dated Nov. 21, 2018.

Japanese Patent Office, Notice of Reason for Rejection for Application No. 2017-551255, dated Aug. 13, 2018.

Kaimie et al., Web Video Clustering using Playlist, Collected Papers of 4th Forum relating to Data Engineering and Information Management (10th Annual Convention of the Database Society of Japan), Japan, The Institute of Electronics, Information and Communication Engineers Data Engineering Research Specialty Committee, The Database Society of Japan, Information Processing Society of Japan Database Systems Research Meeting, Aug. 30, 2012, p. 1 to 7.

* cited by examiner

ALGORITHMIC RADIO FOR ARBITRARY TEXTUAL QUERIES

TECHNICAL FIELD

This disclosure relates to the field of playlists and, in particular, to an algorithmic radio for arbitrary textual queries.

BACKGROUND

A playlist, such as a playlist of songs, may be provided to a user to view or access the content items of the playlist. For example, a playlist may include multiple songs so that the user may sequentially or randomly listen to the songs in the playlist. Characteristics of the user may be used to provide the playlist to the user. For example, songs may be included in the playlist based on the types of songs that the user has previously listened to or based on the types of songs for which the user does not listen. A song may be included in the playlist if the song is similar to other songs that the user has listened to while another song may not be included in the playlist if the song is similar to other songs that the user has indicated that he or she does not enjoy.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to receive a text query from a user and identify playlists that are associated with the text query. A relevance score may be calculated for each of the playlists based at least in part on a relevance of the corresponding playlist to the text query. Content items may be identified where each of the content items may be included in at least one of the playlists. For each of the identified content items, one or more playlists may be identified that includes the corresponding content item. Furthermore, a score may be calculated for each of the content items based on the relevance score for each of the playlists that includes the corresponding content item. A new playlist may be generated for the user based on the scores for each of the content items.

In some embodiments, the score for each of the content items may further be based on an aggregation of each of the relevance scores for each of the playlists that includes the corresponding content item.

In some embodiments, the calculating of the relevance score for each of the playlists may be further based on a frequency of use of the corresponding playlist or a recency of modification of the corresponding playlist. Furthermore, the frequency of use of the corresponding playlist is associated with a frequency of content items of the corresponding playlist being accessed by one or more users and the recency of modification (e.g., the last time that a modification occurred) of the corresponding playlist may be associated with when at least one content item has been added to or removed from the corresponding playlist.

In some embodiments, the method may further provide the new playlist as a radio station in a search result in response to the text query that is associated with the search.

In some embodiments, the new playlist may include a subset of the content items that are included in at least one of the playlists.

In some embodiments, the new playlist includes identifications of a subset of the content items based on the scores, and each of the identifications of the subset of the content items provides access to the corresponding content item.

In some embodiments, a non-transitory machine-readable storage medium storing instructions may be executed to cause a processing device to perform operations such as receiving a text query from a user and identifying playlists that are associated with the text query. The operations may further calculate a relevance score for each of the playlists based at least in part on a relevance of the corresponding playlist to the text query. Furthermore, the operations may identify content items where each of the content items may be included in at least one of the playlists. For each of the identified content items, one or more playlists that includes the corresponding content item may be identified. Furthermore, the operations may calculate a score for each of the content items based on the relevance score for each of the playlists that includes the corresponding content item. The operations may further generate a new playlist for the user based on the scores for each of the content items.

In some embodiments, a system may include a memory and a processing device coupled to the memory. The processing device may receive a text query from a user and identify playlists that are associated with the text query. The processing device may also calculate a relevance score for each of the playlists based at least in part on a relevance of the corresponding playlist to the text query. Furthermore, the processing device may identify content items where each of the content items may be included in at least one of the playlists. For each of the identified content items, one or more playlists that includes the corresponding content item may be identified. Furthermore, the processing device may calculate a score for each of the content items based on the relevance score for each of the playlists that includes the corresponding content item. The processing device may further generate a new playlist for the user based on the scores for each of the content items.

BRIEF DESCRIPTION OF THE DRAWINGS

The present disclosure is illustrated by way of example, and not by way of limitation, in the figures of the accompanying drawings.

DETAILED DESCRIPTION

Aspects of the present disclosure relate to an algorithmic radio for arbitrary textual queries. The algorithmic radio may correspond to a playlist. For example, the playlist may be generated in response to a search based on the text query that includes a text string or keywords. The playlist may identify multiple content items. For example, the playlist may be a playlist with content items corresponding to songs or videos, a book list of audio books or electronic books, or any other grouping of content or content items.

As an example, a user may perform a search for content items (e.g., music videos) by providing a text query. In response to the search based on the text query, various music videos may be provided to the user as part of the search results. The text query provided by the user may be used to generate a new playlist that may be included in the search results. For example, the new playlist may be provided as an automatically generated playlist for the user based on the user's text query.

The new playlist may be generated based on other playlists that are associated with the text query. For example, previously created playlists provided by other users may be identified based on the previously created playlists matching the text query. A relevance score may be calculated for each of the previously created playlists. For example, a relevance of one of the playlists matching the text query, a frequency of the playlist being accessed by users, a last date that the playlist was modified (e.g., a date that the last content item was added to or removed from the playlist), or other such factors may be used to calculate the relevance score for each of the previously created playlists.

Each unique content item that is included in any of the previously created playlists that match the text query may be identified. For example, multiple content items may be identified as having been included in at least one of the playlists that match the text query. An aggregate score may be calculated for each of the content items. The aggregate score for each content item may be calculated based on an aggregation of the relevance scores calculated for the previously created playlists that includes the corresponding content item. For example, if a content item is included in a first playlist and a second playlist, then the aggregate score for the content item may be based on an aggregation of the relevance score for the first playlist and the relevance score for the second playlist. In some embodiments, the aggregate score for the content item may be based on additional factors as described in further detail below.

As a result, aggregate scores for each content item included in any of the playlists that match the text query may be identified. A subset of the content items may then be selected to be included in a new playlist that will be generated and provided to the user in response to the search including the text query. For example, the content items with the top scores may be selected to be included in the new playlist. In some embodiments, additional factors may be used to select the content items to be included in the new playlist as will be described in further detail.

Thus, a text query from a user may be provided to create a new playlist. The text query may be considered a type of seed or a data item that is used to create other data (e.g., the new playlist) as opposed to user behavior for identifying content based on whether a user has accessed a particular content item or indicated that he or she dislikes a particular content item. Accordingly, the generation of a new playlist based on a text query may allow a user to more easily express a type of playlist in terms of various artists, genres, themes, or other such contexts for a new playlist.

As an example, a user may provide a text query from a graphical user interface to search for videos provided through the graphical user interface. The new playlist may be generated to identify multiple videos. Furthermore, the new playlist may be considered a radio station that has been generated for the user based on the text query that the user has provided for the search of videos. The radio station may be a list of videos that are played in a continuous sequence when the user accesses the radio station or playlist. For example, the radio station or playlist may be provided in the search results that are returned to the user in response to the providing of the text query.

Figure 1:
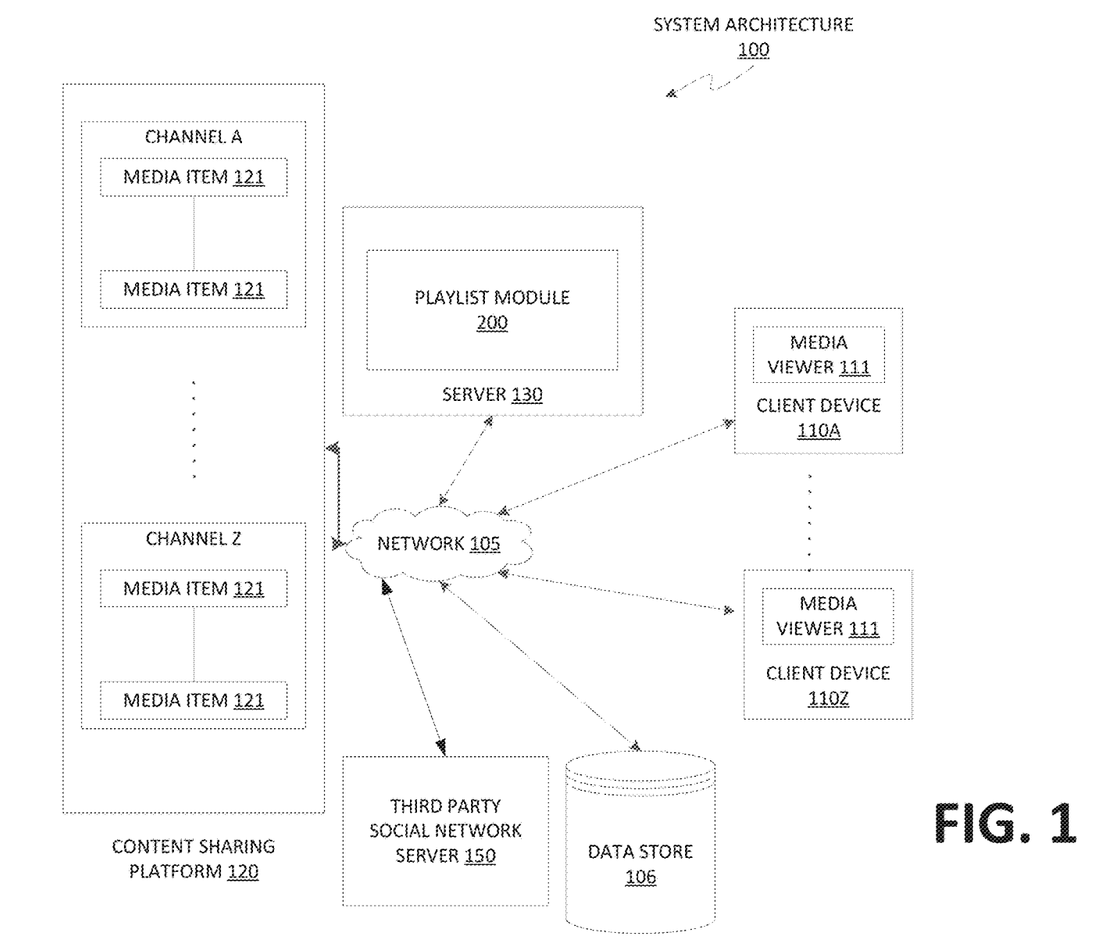
FIG. 1 illustrates an example system architecture in which embodiments of the present disclosure may operate.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. The content sharing platform 120 may also store playlists created by users, third parties or automatically. A playlist may include a list of content items (e.g., videos) that can be played (e.g., streamed) in sequential or shuffled order on the content sharing platform.

In one implementation, the server 130 may be one or more computing devices (e.g., a rackmount server, a server computer, etc.). The server 130 may be included in the content sharing platform 120 or be part of a different system. The server 130 may host a playlist module 200 that generates a playlist based on a text query. Further details with regard to the playlist module 200 are disclosed in conjunction with FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
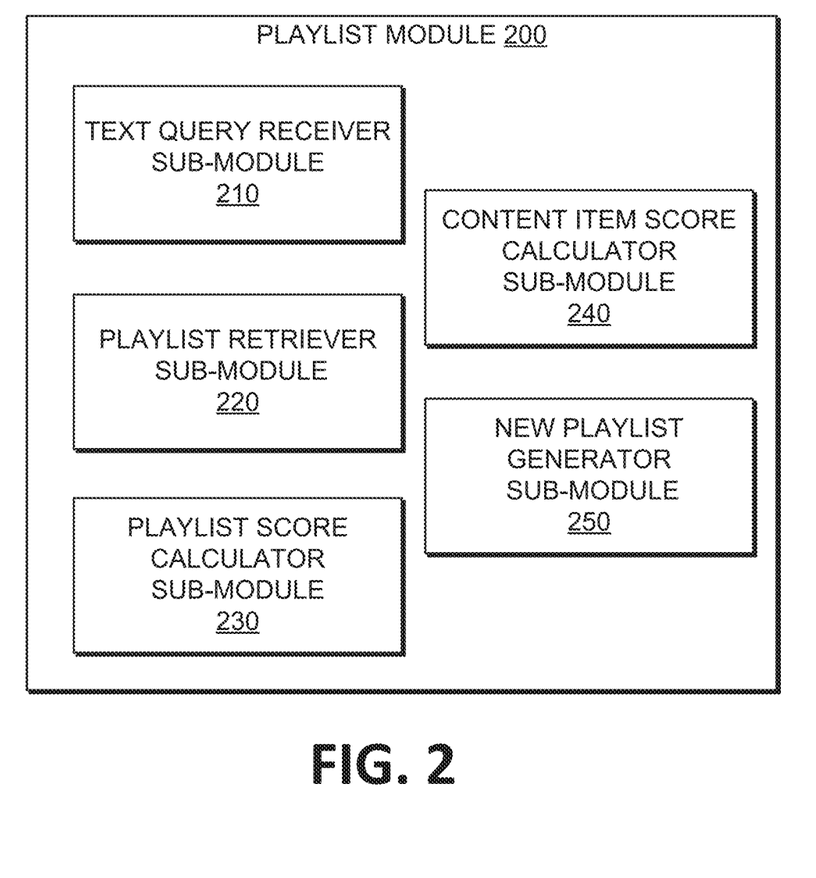
FIG. 2 illustrates an example playlist module in accordance with some embodiments of the disclosure.

FIG. 2 illustrates an example playlist module 200. In general, the playlist module 200 may correspond to the playlist module 131 of a server system 130 as shown in FIG. 1. The playlist module 200 may include a text query receiver sub-module 210, a playlist retriever sub-module 220, a playlist score calculator sub-module 230, a content item score calculator sub-module 240, and a new playlist generator sub-module 250. In alternative embodiments, the functionality of one or more of the sub-modules may be combined or divided.

As shown in FIG. 2, the playlist module 200 may include a text query receiver sub-module 210 that may receive a search text query associated with a search from a user or client device. The text query may correspond to a search of content items (e.g., a video). For example, the text query may be a text string or a combination of text strings or keywords (e.g., conjunctions of artist or author names, genres, eras, themes, or other such contexts). The playlist retriever sub-module 220 may retrieve one or more playlists. For example, the playlist retriever sub-module 220 may retrieve a playlist in response to the search text query. The retrieved playlists may match search criteria of the text query. A playlist may include a title, a description, or other such information that may describe and/or identify the playlist. For example, if the search criteria of the text query matches the title or description of a playlist, then the playlist may be retrieved in response to the text query. Thus, multiple playlists may be retrieved if the playlists match the text query.

Referring to FIG. 2, the playlist module 200 may further include a playlist score calculator sub-module 230 that may calculate or determine a relevance score for a playlist. For example, a relevance score for each retrieved playlist that matches the text query may be calculated. The relevance score for each playlist may be calculated based on several factors as described in further detail in conjunction with FIG. 4. The playlist module 200 may additionally include a content item score calculator sub-module 240 that may calculate an aggregate score for each content item that is included in each of the retrieved playlists. The aggregate score may be based on the relevance score for each playlist that includes a corresponding content item. Further details with regard to calculating an aggregate score for a content item are disclosed in conjunction with FIG. 5.

Furthermore, the playlist module 200 may include a new playlist generator sub-module 250 that may generate a new playlist based on the aggregate scores of the content items included in the retrieved playlists. The new playlist may be provided in response to the search text query and may further be provided as a search result in a graphical user interface (GUI). Further details with regard to generating the new playlist are described in conjunction with FIGS. 3, 6, and 7.

Figure 3:
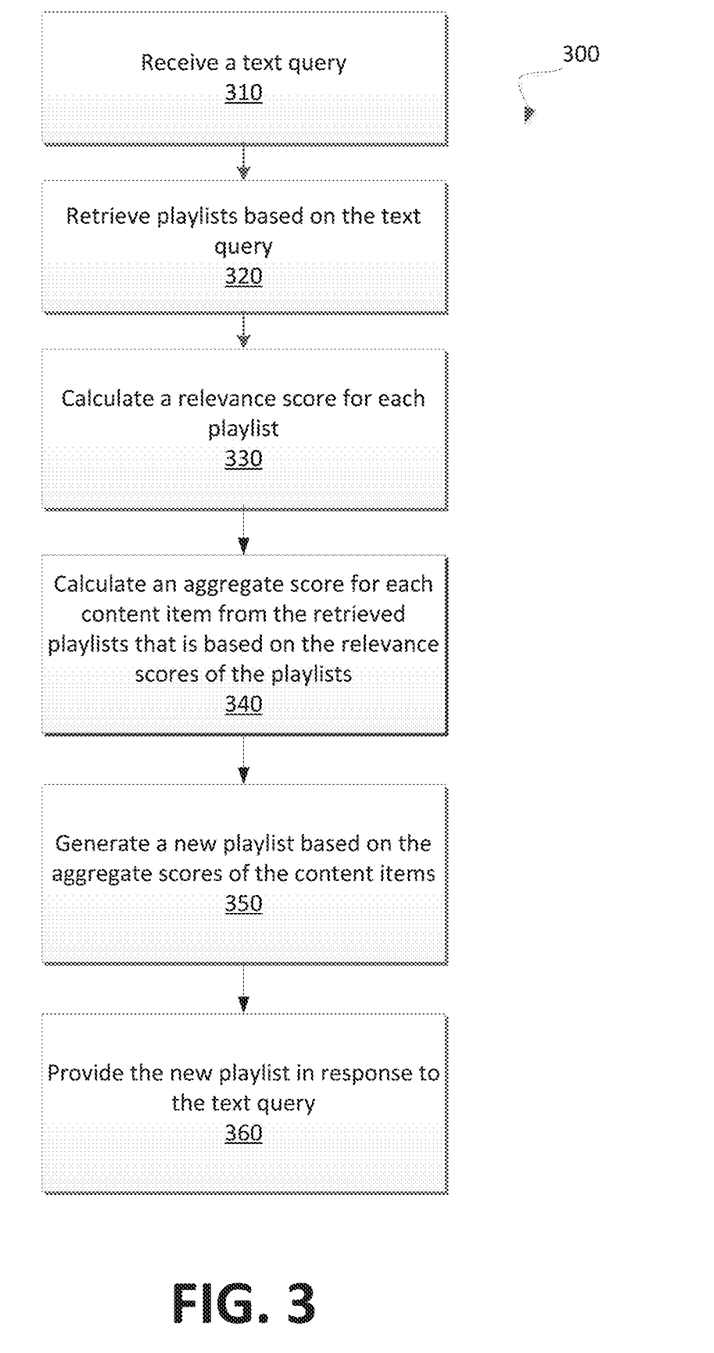
FIG. 3 is a flow diagram of an example method to generate a playlist based on aggregate scores for content items in accordance with some embodiments.

FIG. 3 is a flow diagram of an example method 300 to generate a playlist based on aggregate scores for content items. In general, the method 300 may be performed by processing logic that may comprise hardware (e.g., processing device, circuitry, dedicated logic, programmable logic, microcode, etc.), software (e.g., instructions run on a processing device), or a combination thereof. In some embodiments, the method 300 may be performed by the playlist module 131 or 200 of FIG. 1 or 2.

As shown in FIG. 3, the method 300 may begin by the processing logic receiving a text query (block 310). For example, a text query that is provided for a search of content may be provided by a user of a client device to a server system managing content items. The processing logic may further retrieve playlists based on the text query (block 320). For example, a subset of content items of a plurality of content items that match the text query may be identified. In some embodiments, each playlist may include or identify content items. For example, the playlist may be considered a grouping or selection of one or more content items that are available to be viewed or accessed by the user of the client device. The processing logic may further calculate a relevance score for each of the playlists (block 330). For example, a relevance score for each of the retrieved playlists may be calculated based on a relevance of the playlist to the text query, a frequency of use or access of the playlist, the time or date of the last edit or modification of the playlist, or other such factors as described in further detail with regard to FIG. 4.

Referring to FIG. 3, the processing logic may further calculate an aggregate score for each content item from the retrieved playlists based on the relevance scores for the playlists (block 340). In some embodiments, the aggregate score for a content item may be based on an aggregation of the relevance score for each playlist that includes the content item. Further details with regard to calculating the aggregate score are disclosed in conjunction with FIG. 5.

The processing logic may further generate a new playlist based on the aggregate scores for the content items (block 350). For example, the content items with the top aggregate scores may be included in the new playlist. In some embodiments, duplicate content items may be removed (e.g., all but one identical content item is removed) or a maximum number of content items associated with an artist (e.g., a singer or performer, author, etc.) may be provided. For example, if a maximum of five content items from a single author is specified and if ten content items from the single artist are in the top aggregate scores for the content items, then five of the content items may be included in the new playlist and the remaining five may be included in the new playlist. For example, the content items from the same artist with the highest aggregate scores may be selected to be included in the new playlist while the content items with lower aggregate scores may not be selected to be included in the new playlist.

As an example, a user may provide a text query associated with a search for music videos (i.e., content items). The text query may include the text string '1980s music videos.' Playlists of music videos (i.e., playlists) may be identified where the title, description, or other description information of the playlists match search criteria of the text query. A relevance score for each playlist may be calculated. Each music video in each of the playlists may be identified and an aggregate score for each of the music videos may be calculated based on the relevance scores for the playlists. A new playlist may be generated based on the aggregate scores for the music videos. Furthermore, the new playlist may be provided to the user in response to the text query. The new playlist may then be selected by the user from a search results list and the user may play or view the music videos that have been selected to be included in the new playlist.

Figure 4:
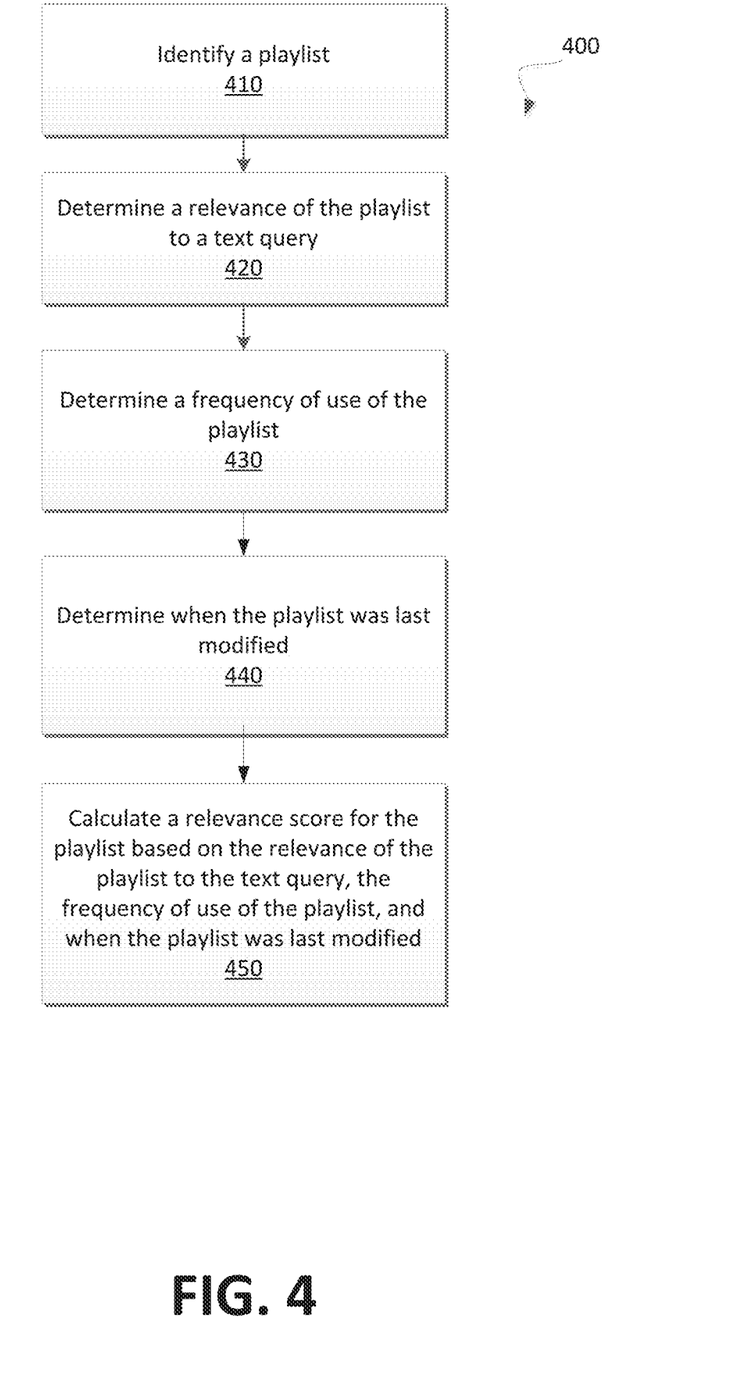
FIG. 4 is a flow diagram of an example method to determine a relevance score for a playlist in accordance with some embodiments of the present disclosure.

FIG. 4 is a flow diagram of an example method 400 to determine a relevance score for a playlist. In general, the method 400 may be performed by processing logic that may comprise hardware (e.g., processing device, circuitry, dedicated logic, programmable logic, microcode, etc.), software (e.g., instructions run on a processing device), or a combination thereof. In some embodiments, the method 400 may be performed by the playlist module 131 or 200 of FIG. 1 or 2.

As shown in FIG. 4 the method 400 may begin by the processing logic identifying a playlist (block 410). For example, the playlist may be one of multiple playlists, from among a larger number of playlists, which are retrieved based on the playlists matching search criteria of a text query. The playlist may include a list or grouping of multiple content items so that if a user accesses the playlist, an identification of each of the content items of the playlist may be provided to the user for accessing the corresponding content items. The processing logic may further determine a relevance of the playlist to the text query (block 420). The relevance of the playlist to the text query may be based on a matching of the title, description, or any other data associated with the playlist with the keywords of the search text query. For example, a playlist may be considered to have a higher relevance score if more keywords of the text query are included in the title or description of the playlist while a playlist may be considered to have a lower relevance score if fewer keywords of the text query are included in the title or description of the playlist. Thus, the relevance of the playlist to the text query may be based on a matching of the title or description of a playlist with the keywords of the text query. The processing logic may further determine a frequency of use of the playlist (block 430). For example, a number of times that the playlist has been accessed or used by one or more users may be identified. The playlist may be considered to have been accessed when a user is provided the playlist and selects an identification of a content item from the playlist to access the corresponding content item. In alternative embodiments, the frequency of use of the playlist may be based on a number of instances where the playlist has been accessed by one or more users during a particular time period. The processing logic may determine when the playlist was last modified (block 440). For example, the last time that the title, description, or a new content item has been added to the playlist or the last time that a content item was removed from the playlist may be identified. Thus, the recency of the last modification of the playlist may be used to determine the relevance score of the playlist.

Referring to FIG. 4, the processing logic may calculate a relevance score for the playlist based on the relevance of the playlist to the text query, the frequency of use of the playlist, and the last time that the playlist was modified (block 450). The relevance score may be calculated based on the following formula using a sigmoid function of text query relevance as illustrated below:

$$\text{Relevance score} = \text{sigmoid}(r) = 1.0/(1.0 + \exp((5.0 - r)/2.0))$$

In some embodiments, r may be the relevance of a playlist to a text query (i.e., search query relevance). In the same or alternative embodiments, the relevance score may be set to zero based on the frequency of use and/or the last modification of the playlist. For example, the relevance score for a playlist may be set to a value of zero if the date of last modification of the playlist exceeds a threshold number of days and/or if the frequency of use is below a threshold amount of use (e.g., a number of views or access of the playlist is below a threshold amount of views or access). In the same or alternative embodiments, the relevance score for a playlist may be calculated based on the following:

$$\text{Relevance score} = \text{sigmoid}(r) - \text{alpha} * a + \text{beta} * \log(v)$$

In some embodiments, r may correspond to the relevance of the playlist to a text query, a may correspond to the number of days since the last modification of the playlist, and v may correspond to the number of views or access of the playlist (i.e., frequency of use). Alpha and beta may each be non-negative constants that are used to weight the relative importance of the last modification and frequency of use of the playlist.

In some embodiments, the method 400 may be performed for each playlist that has been retrieved in response to a text query. In alternative embodiments, the method 400 may be performed for a subset of the playlists that have been retrieved in response to the text query. For example, a relevance score may be calculated for a subset of multiple playlists (e.g., for the first 500 out of 5000 retrieved playlists).

Figure 5:
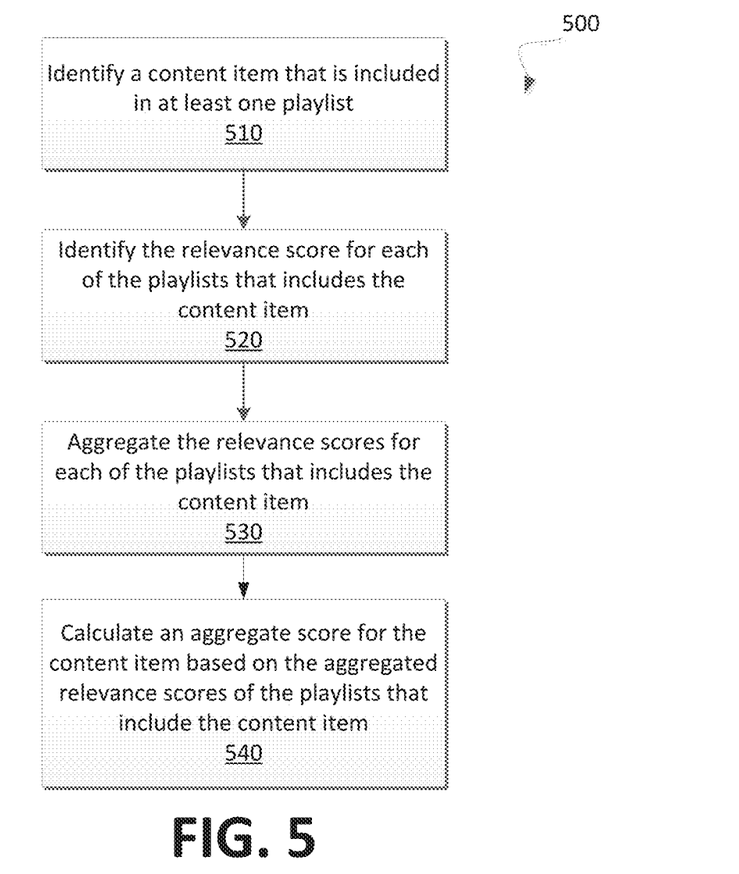
FIG. 5 is a flow diagram of an example method to determine an aggregate score for a content item in accordance with some embodiments.

FIG. 5 is a flow diagram of an example method 500 to determine an aggregate score for a content item. In general, the method 500 may be performed by processing logic that may comprise hardware (e.g., processing device, circuitry, dedicated logic, programmable logic, microcode, etc.), software (e.g., instructions run on a processing device), or a combination thereof. In some embodiments, the method 500 may be performed by the playlist module 131 or 200 of FIG. 1 or 2.

As shown in FIG. 5, the method 500 may begin by the processing logic identifying a content item that is included in at least one playlist (block 510). For example, the content item may be included in one or more playlists that are retrieved in response to a text query. The processing logic may further identify the relevance score for each of the playlists that includes the content item (block 520). For example, each relevance score for each of the retrieved playlists that includes the content item may be identified. The processing logic may further aggregate the relevance scores for each of the playlists that includes the content item (block 530). For example, the relevance scores for each playlist that includes the content item may be added to each other. Furthermore, the processing logic may calculate an aggregate score for the content item based on the aggregated relevance scores for each of the playlists that includes the content item (block 540). For example, the aggregate score for a content item may be a summation of the relevance scores of the playlists that include the content item. In some embodiments, the aggregate score for the content item may be based on a scale between 0 to 1.0. For example, a maximum score for a content item may not exceed an upper value of the scale so that if a content item is included in a large number of playlists, then the maximum value for the content item may be the same as another content that is not included in the same number of playlists or does not have the same value of aggregated relevance scores.

Figure 6:
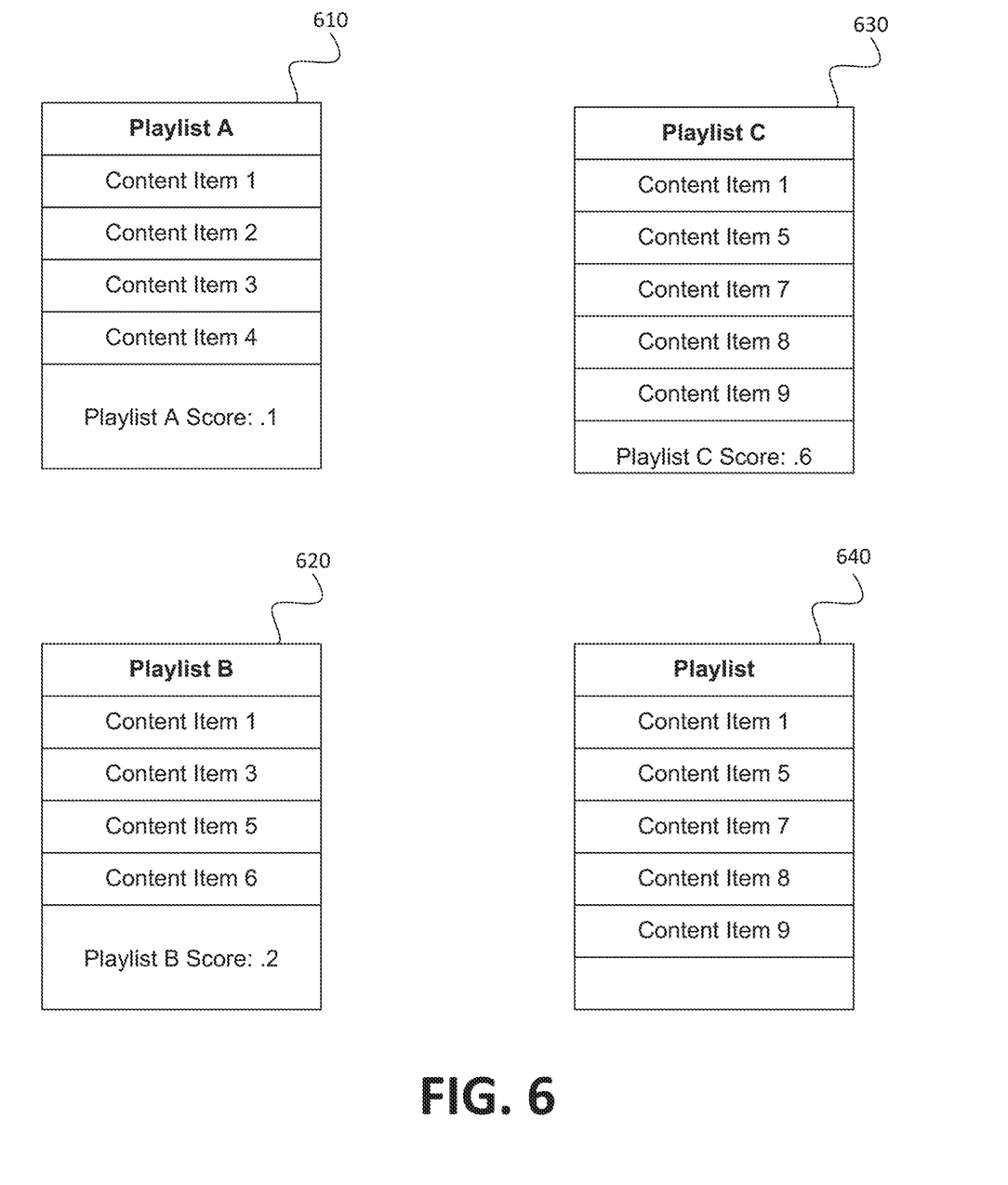
FIG. 6 illustrates playlists including content items in accordance with some embodiments of the present disclosure.

Further details with regard to calculating the aggregate score of a content item is described in conjunction with FIG. 6.

FIG. 6 illustrates playlists 610, 620, 630, and 640 including content items. In general, the playlists 610, 620, and 630 may be retrieved by the playlist module 131 or 200 of FIG. 1 or 2 in response to a text query and the playlist 640 may be generated by the playlist module 131 or 200 of FIG. 1 or 2.

A shown in FIG. 6, the playlist 610 (i.e., playlist A) may include content items 1, 2, 3, and 4 and may have a relevance score of 0.1. The playlist 620 (i.e., playlist B) may include content items 1, 3, 5, and 6 and have a relevance score of 0.2 while the playlist 630 may include content items 1, 7, 8, and 9 and have a relevance score of 0.6. The playlist 640 may be generated based on the aggregate scores of content items from the playlists 610, 620, and 630. For example, an aggregate score of 0.9 for the content item 1 may be calculated based on an aggregation of the relevance scores for the playlists A, B, and C that include the content item 1 (e.g., 0.1+0.2+0.6=0.9). Similarly, aggregate scores for content items 2 through 9 may be calculated based on an aggregation of the relevance scores for the playlists that include the corresponding content item. Thus, content item 2 may have an aggregate score of 0.1, content item 3 may have an aggregate score of 0.4, content item 4 may have an aggregate score of 0.1, content item 5 may have an aggregate score of 0.8, content item 6 may have an aggregate score of 0.2, and each of content items 7, 8, and 9 may have an aggregate score of 0.6.

The playlist 640 may be a new playlist that is generated based on the top or highest aggregate scores that have been calculated for the content items. For example, content items with higher aggregate scores may be included in the playlist 640 while content items with lower aggregate scores may not be included in the playlist 640. For example, a threshold number of content items may be selected to be included in the playlist 640. For example, if the threshold number of content items to be included in the playlist 640 is five content items, then the playlist 640 may include the five content items 1 through 9 that include the four highest aggregate scores. For example, the playlist 640 may include the content items 1, 5, 7, 8, and 9 and not include the content items 2, 3, 4, and 6.

Figure 7:
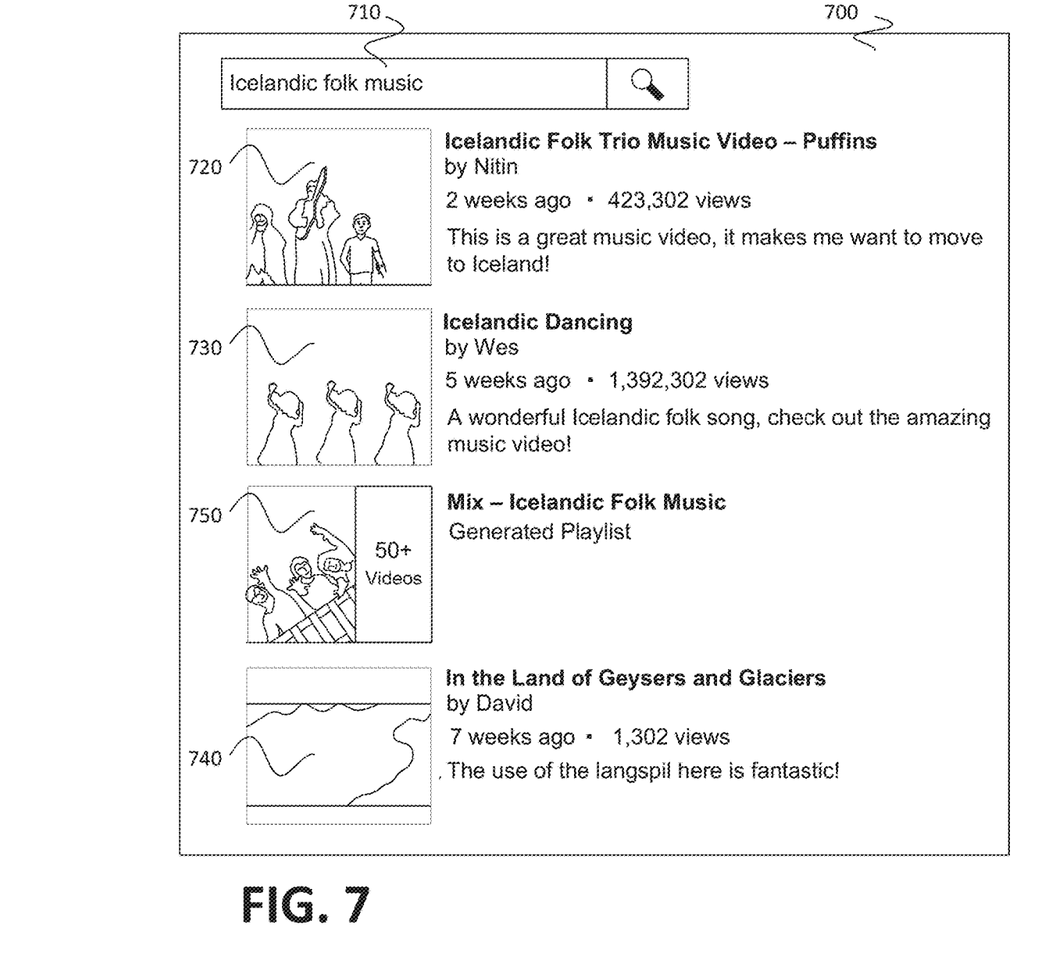
FIG. 7 illustrates an example graphical user interface providing a playlist that has been generated based on aggregate scores for content items in accordance with some embodiments of the present disclosure.

FIG. 7 illustrates an example graphical user interface (GUI) 700 providing a playlist that has been generated based on aggregate scores for content items. In general, the playlist of the graphical user interface 700 may be provided by the playlist module 131 or 200 of FIG. 1 or 2 in response to a text query from the GUI.

As shown in FIG. 7, the graphical user interface 700 may include a text box 710 in which a text query may be entered. The text query may be provided to perform a search of videos associated with the graphical user interface 700. In response to a submission of the text query, a search results page or list may be provided by the graphical user interface 700. The search results page may include multiple content items, such as videos, and a playlist, such as a playlist of music videos, that has been generated in response to the search text query. For example, the search results page of the GUI 700 may include a first video 720, a second video 730, a third video 740, and a generated playlist 750 (i.e., a generated playlist). The generated playlist 750 may be provided in the search results that includes the first video 720, second video 730, and the third video 740. For example, the generated playlist 750 may be provided as a search result along with the first, second, and third videos 720, 730, and 740. In some embodiments, the generated playlist 750 may be provided as a search result between two of the videos that are identified in the search results.

A user may subsequently select the generated playlist 750 from the search results of the graphical user interface 700 to access the content items that have been included in the generated playlist (e.g., based on the aggregate scores of the content items).

In some embodiments, the generated playlist (e.g., the playlist) may be provided based on an identification of a type of text query that has been submitted. For example, if a user has entered a text query corresponding to a specific content item (e.g., a specific title of a content item), then the generated playlist may not be provided to the user. However, if the text query corresponds to a general category or context of content items, then the generated playlist may be provided to the user in the returned search results. As an example, with reference to FIG. 7, the search text query of "Icelandic folk music" may be considered a general category of content items as the text query is a general description of a broad category or genre of content items or music. However, if the text query was the specific title of a content item or song (e.g., "In the Land of Geysers and Glaciers" of the third video 750), then the playlist may not be generated and provided in the returned search results.

Figure 8:
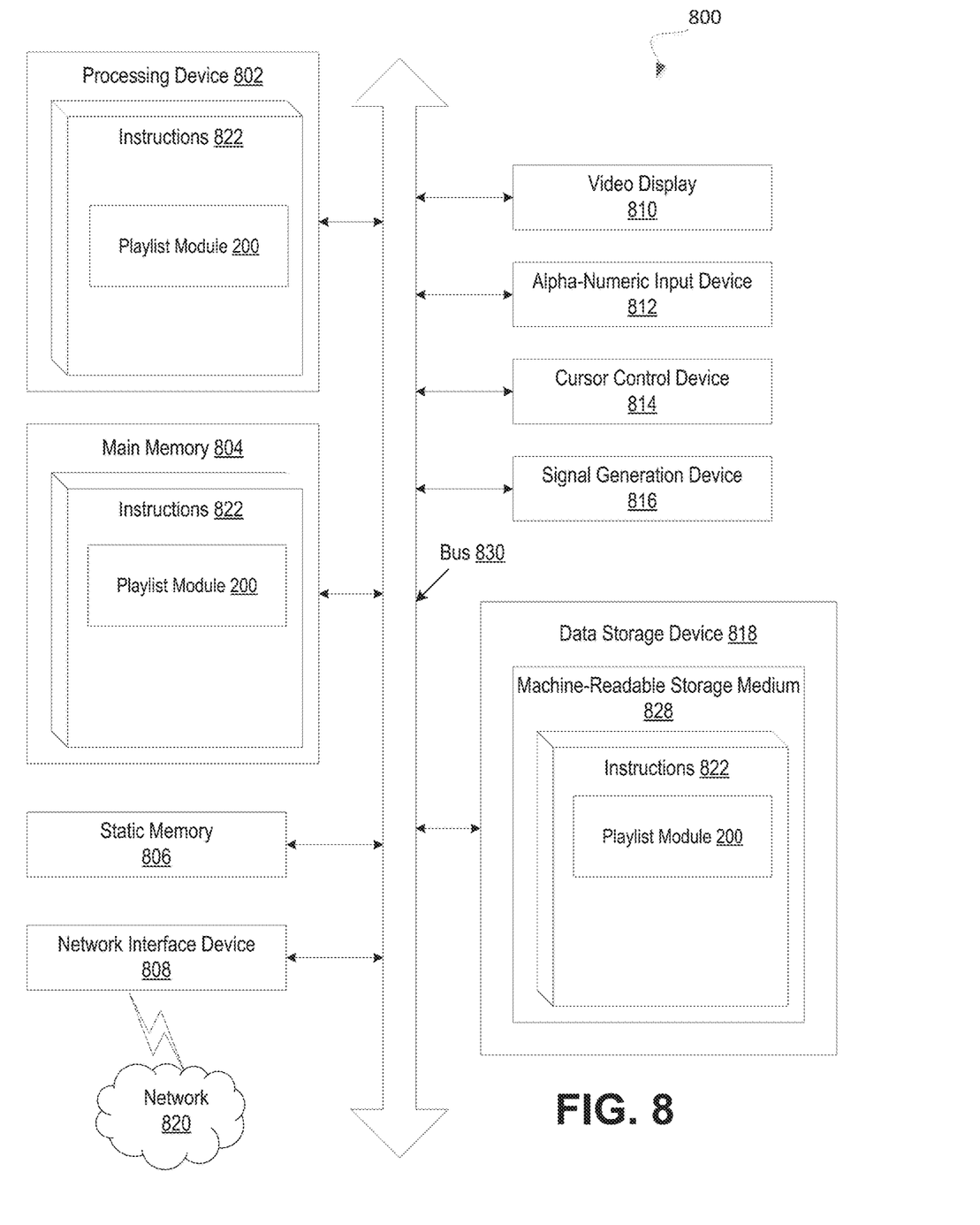
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM, etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a playlist module (e.g., playlist module 131 or 200 of FIG. 1 or 2) and/or a software library containing methods that call modules or sub-modules in a playlist module. While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising:
receiving, by a processor, a text query from a user;
identifying, by the processor, a plurality of playlists associated with the text query, wherein at least a subset of the plurality of playlists has been previously created by other users;
calculating, by the processor, a relevance score for each playlist of the plurality of playlists based at least in part on a relevance of a corresponding playlist to the text query and a frequency of use of the corresponding playlist by one or more users to access particular content items included in the corresponding playlist;
identifying, by the processor, a plurality of content items, wherein each content item of the plurality of content items is included in at least one of the plurality of playlists;
for each content item of the identified plurality of content items, identifying, by the processor, one or more playlists of the plurality of playlists that include corresponding content item;
calculating, by the processor, a score for each content item of the plurality of content items based on the relevance score for each playlist of the one or more playlists that include the corresponding content item;
determining, by the processor, whether the text query from the user identifies a category associated with the content items or identifies a title of a particular content item of the plurality of content items;
generating, by the processor, a new playlist for the user based on the scores for each content item of the plurality of content items, wherein the new playlist includes a subset of the plurality of content items that are included in one or more of the plurality of playlists; and in response to determining that the text query identifies the category associated with content items and does not identity the title of the particular content item, providing the new playlist in a search result with other content items in response to receiving the text query from the user.

2. The method of claim 1, wherein the score for each content item of the content items is further based on an aggregation of each relevance score of the relevance scores for each playlist of the one or more playlists that includes the corresponding content item.

3. The method of claim 1, wherein the calculating of the relevance score for each playlist of the plurality of playlists is further based on a recency of modification of the corresponding playlist.

4. The method of claim 3, wherein the recency of modification of the corresponding playlist is associated with when at least one content item has been added to or removed from the corresponding playlist.

5. The method of claim 1, wherein the new playlist and the other content items in the search results are based on the text query.

6. The method of claim 1, wherein the new playlist comprises identifications of a subset of the plurality of content items based on the scores, and wherein each identification of the identifications of the subset of the plurality of content items provides access to the corresponding content item.

7. A non-transitory machine-readable storage medium storing instructions which, when executed, cause a processor of processing device to perform operations comprising:
receiving a text query from a user;
identifying a plurality of playlists associated with the text query, wherein at least a subset of the plurality of playlists has been previously created by other users;
calculating a relevance score for each playlist of the plurality of playlists based at least in part on a relevance of a corresponding playlist to the text query and a frequency of use of the corresponding playlist by one or more users to access particular content items included in the corresponding playlist;
identifying a plurality of content items, wherein each content item of the plurality of content items is included in at least one of the plurality of playlists;
for each content item of the identified plurality of content items, identifying one or more playlists of the plurality of playlists that includes the corresponding content item;
calculating a score for each content item of the plurality of content items based on the relevance score for each playlist of the one or more playlists that includes the corresponding content item;
determining whether the text query from the user identifies a category associated with content items or identifies a title of a particular content item of the plurality of content items;
generating a new playlist for the user based on the scores for each content item of the plurality of content items, wherein the new playlist includes a subset of the plurality of content items that are included in one or more of the plurality of playlists;
and in response to determining that the text query identifies the category associated with content items and does not identify the title of the particular content item, providing the new playlist in a search result in response to receiving the text query from the user.

8. The non-transitory machine-readable storage medium of claim 7, wherein the score for each content item of the content items is further based on an aggregation of each relevance score of the relevance scores for each playlist of the one or more playlists that includes the corresponding content item.

9. The non-transitory machine-readable storage medium of claim 7, wherein the calculating of the relevance score for each playlist of the plurality of playlists is further based on a recency of modification of the corresponding playlist.

10. The non-transitory machine-readable storage medium of claim 9, wherein the recency of modification of the corresponding playlist is associated with when at least one content item has been added to or removed from the corresponding playlist.

11. The non-transitory machine-readable storage medium of claim 7, wherein the new playlist and the other content items are based on the text query.

12. The non-transitory machine-readable storage medium of claim 7, wherein the new playlist comprises identifications of a subset of the plurality of content items based on the scores, and wherein each identification of the identifications of the subset of the plurality of content items provides access to the corresponding content item.

13. A system comprising:
a memory; and a processor of a processing device operatively coupled with the memory to:
receive a text query from a user;
identify a plurality of playlists associated with the text query, wherein at least a subset of the plurality of playlists has been previously created by other users;
calculate a relevance score for each playlist of the plurality of playlists based at least in part on a relevance of a corresponding playlist to the text query and a frequency of use of the corresponding playlist by one or more users to access particular content items included in the corresponding playlist;
identify a plurality of content items, wherein each content item of the plurality of content items is included in at least one of the plurality of playlists;
for each content item of the plurality of content items, identify one or more playlists of the plurality of playlists that includes corresponding content item;
calculate a score for each content item of the plurality of content items based on the relevance score for each playlist of the one or more playlists that includes the corresponding content item;
determine whether the text query from the user identifies a category associated with content items or identifies a title of a particular content item of the plurality of content items;
generate a new playlist for the user based on the scores for each content item of the plurality of content items, wherein the new playlist includes a subset of the plurality of content items that are included in one or more of the plurality of playlists; and
in response to determining that the text query identifies the category associated with content items and does not identify the title of the particular content item, provide the new playlist in a search result in response to receiving the text query from the user.

14. The system of claim 13, wherein the score for each content item of the content items is further based on an aggregation of each relevance score of the relevance scores for each playlist of the one or more playlists that includes the corresponding content item.

15. The system of claim 13, wherein the calculating of the relevance score for each playlist of the plurality of playlists is further based on a recency of modification of the corresponding playlist.

16. The system of claim 15, wherein the recency of modification of the corresponding playlist is associated with when at least one content item has been added to or removed from the corresponding playlist.

17. The system of claim 13, wherein the new playlist and the other content items are based on the text query.

18. The system of claim 13, wherein the new playlist comprises identifications of a subset of the plurality of content items based on the scores, and wherein each identification of the identifications of the subset of the plurality of content items provides access to the corresponding content item.

\* \* \* \* \*